Figure 6:
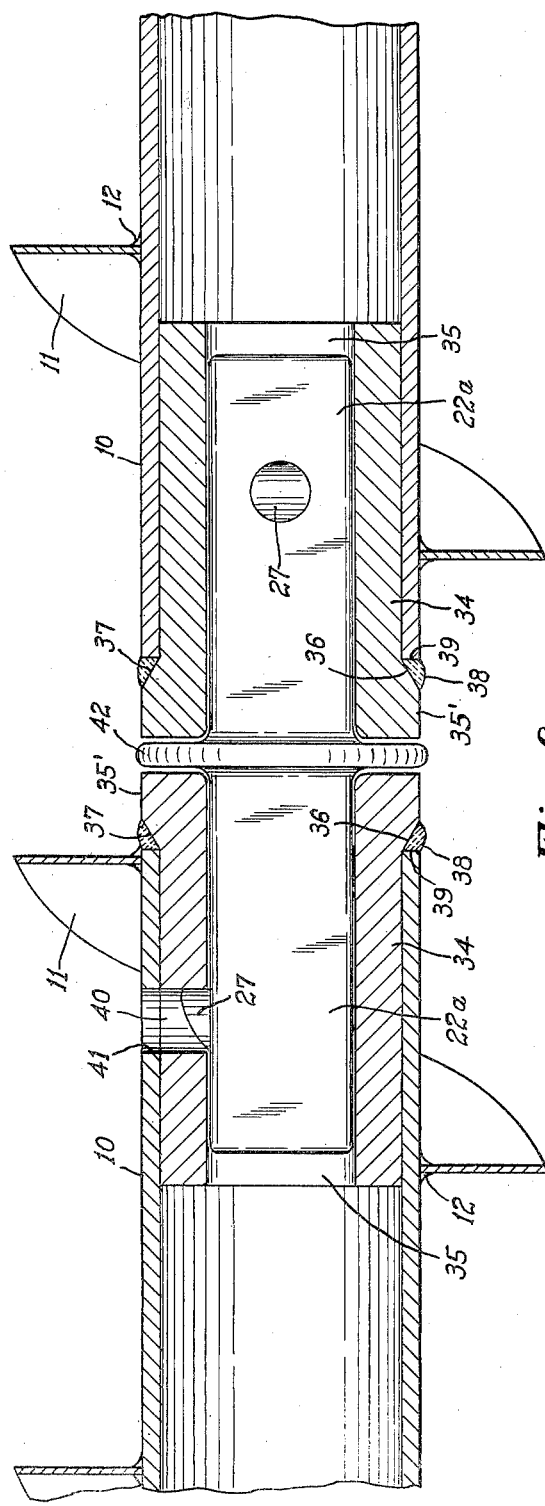

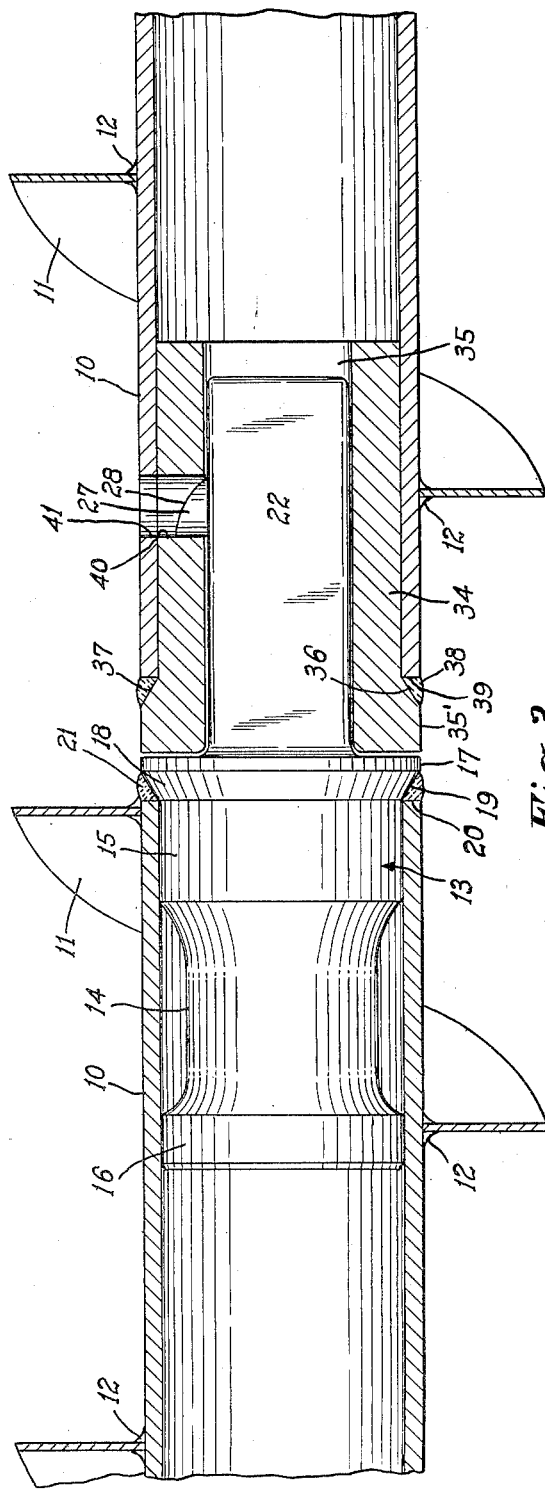
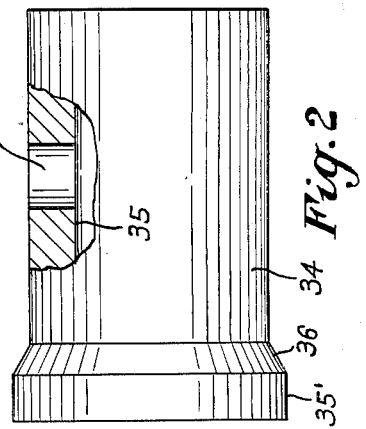
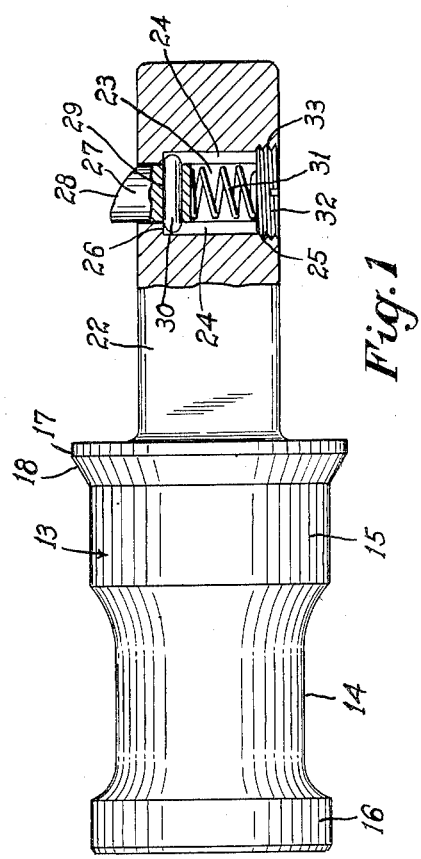
INVENTOR.
Harry L. Weikart
BY
ATTORNEYS

March 11, 1952 H. L. WEIKART 2,588,901
SHANK AND SOCKET CONNECTION FOR AUGERS
Filed May 19, 1949 2 SHEETS—SHEET 2

INVENTOR.
Harry L. Weikart
BY
Frease and Bishop
ATTORNEYS

Patented Mar. 11, 1952

2,588,901

UNITED STATES PATENT OFFICE 2,588,901

SHANK AND SOCKET CONNECTION FOR AUGERS

Harry L. Weikart, Salem, Ohio, assignor to The Salem Tool Company, Salem, Ohio, a corporation of Ohio Application May 19, 1949, Serial No. 94,179

6 Claims. (Cl. 255—69)

The invention relates to connections for sections of augers, such as are used for drilling in earth, rock, coal and the like, and more particularly to a connection comprising a shank for connection to one auger section and a socket connected to an adjacent auger section for receiving said shank.

Auger sections, such as referred to herein, usually comprise a tube having a spiral flight formed upon, or attached to, the exterior thereof and these sections are made of convenient length to permit ease in handling and transportation.

A suitable boring head, or the like, is attached to the leading end of one section and as the same is driven into the earth, additional sections are connected thereto, from time to time, so as to bore into the surface of the earth for a considerable distance.

Under present practice these auger sections are arranged to be axially connected together by means of a shank of square or other suitable cross section, connected to one end of each auger section and a correspondingly shaped socket connected to the other end thereof, the shank of one section being received in the socket of the next adjacent section and being provided with suitable latching means for detachably connecting the auger sections together.

Under present practice these shanks and sockets are inserted into the ends of the tubular shaft portion of the auger section and welded therein. It frequently happens that in use the weld will break and the socket or shank, as the case may be, is pushed back into the tubular auger section.

The object of the present invention is to overcome this disadvantage by providing shank and socket connecting means at the ends of the auger sections which cannot be forced back into the tubular shaft portion of the auger in the event of breakage.

Another object is to provide a shank and socket connection for auger sections in which each member has an enlarged, annular shoulder to prevent the same from being forced into the tubular portion of the auger section.

A further object is to provide such a connection in which each member has a cylindrical portion snugly fitting within the tubular shaft of the auger section and an enlarged, annular shoulder at the outer end of said cylindrical portion.

A still further object is to provide such a construction in which the enlarged annular shoulder is conical, so as to provide an annular recess of V-cross sectional shape between the end of the auger section and the shoulder, to be filled with weld metal for attaching the shank or socket, as the case may be, to the auger section.

Another object is to provide a novel latching device upon the shank for engagement with the socket.

A further object is to provide a connection of this character in which both ends of each auger section are provided with sockets, and a detachable, double shank is provided for engagement in both sockets, said double shank having a central, annular shoulder or flange, received between the adjacent ends of the auger sections.

Figure 5:
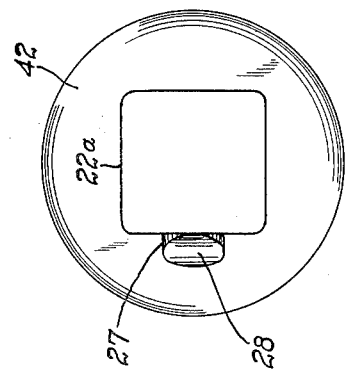
Figure 4:
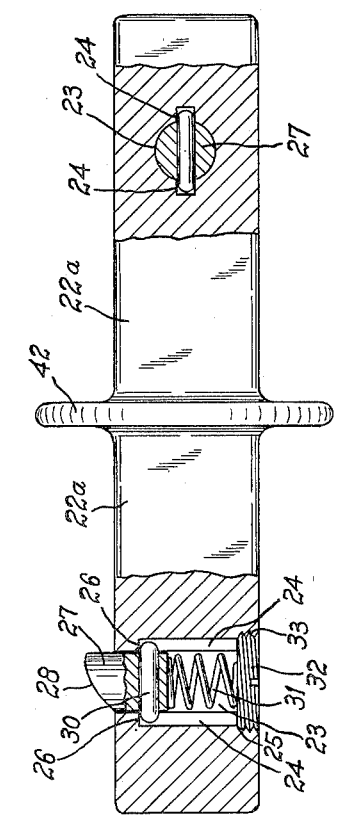

The above and other objects, apparent from the drawings and following description, may be attained, the above described difficulties overcome and the advantages and results obtained by the construction, arrangement, combinations and parts which comprise the present invention, preferred embodiments of which, illustrative of the best mode in which applicant has contemplated applying the principle, being set forth in detail in the following description and illustrated in the accompanying drawings, in which:

Figure 1 is a detached, side elevation of the improved shank member, a portion being broken in section to show the improved latching means carried thereby;

Fig. 2 a side elevation of the improved socket member, with a portion broken in section for the purpose of illustration;

Fig. 3 a longitudinal, sectional view through adjacent end portions of two auger sections connected together by the improved shank and socket connection to which the invention pertains;

Fig. 4 a side elevation of the double shank member, with parts broken in section for the purpose of illustration;

Fig. 5 an end elevation of the double shank member; and

Fig. 6 a longitudinal, sectional view through adjacent end portions of two auger sections, each provided with the improved sockets and connected together by the double shank member, shown in Fig. 4.

The auger sections are of conventional form and each comprises a tubular shaft portion 10, around the exterior of which is located a spiral flight 11, which may be welded to the tubular shaft portion of the auger as indicated at 12, as in usual and well known practice.

These auger sections may be made in any suitable length which may be conveniently handled and transported and are adapted to be axially connected together, end to end, so as to drill a hole of any desired or necessary depth.

Any usual and well known boring head, or the like, is attached to the leading end of the first auger section, as in usual and well known practice, and additional auger sections may be connected thereto by the improved shank and socket connection to which the invention pertains.

In Fig. 1 is shown the shank member, which comprises the cylindrical portion 13 of a diameter to snugly fit within the tubular shaft portion 10 of an auger section as shown in Fig. 3. If desired, the intermediate part of this cylindrical portion may be reduced in diameter, as at 14, so that only the outer and inner ends 15 and 16 thereof are of a diameter to snugly fit within the interior of the tube 10.

At the outer end of the cylindrical portion 13 is formed an annular shoulder 17, preferably of about the same diameter as the exterior of the tube 10, and the inner side of this shoulder is preferably of conical shape, as indicated at 18, so that an annular space, V-shape in cross section as illustrated at 19, is formed between the shoulder and the adjacent end 20 of the tube 10, which space may be filled with weld metal, as indicated at 21, so as to rigidly attach the shank member to the tube.

The shank proper, as indicated at 22, is formed integrally at the outer end of the cylindrical portion 13, and axially aligned therewith, and may be square in cross section as shown in the drawings, or may be of hexagonal, octagonal, or other suitable cross sectional shape.

A suitable latching device may be transversely mounted within the shank. For this purpose a transverse bore 23 is formed through the shank, having the diametrically opposed, longitudinal grooves 24 communicating with each side thereof and extending from the enlarged, screw threaded end 25 of the bore to a point spaced from the opposite side of the shank as indicated at 26.

The latch bolt 27 is of circular cross section, adapted to slidably fit within the bore 23, and has the bevelled outer end 28. A transverse bore 29 is provided in the lower portion of the latch bolt 27, within which is slidably located the pin 30, the rounded ends of which project into the longitudinal grooves 24, at each side of the bore 23, so as to prevent the latch bolt from rotating within the bore 23, as well as to limit the outward movement of the latch bolt, by contact with the shoulders 26, at the ends of said grooves.

A coil spring 31 is located within the bore 23, between the inner end of the latch bolt 27 and the screw cap 32, which is received in the enlarged, threaded end 33 of the bore, normally urging the latch bolt toward the locked position, as shown in Fig. 1, with the opposite ends of the pin 30 contacting the shoulders 26 at the ends of the grooves 24, and the outer end of the latch bolt projecting beyond the adjacent side of the shank 22.

The socket member comprises the cylindrical portion 34, of a diameter to snugly fit within the tubular shaft portion 10 of the auger section, as shown in Fig. 3, and as shown in said figure, a longitudinal bore 35, of the cross sectional shape and size of the shank 22, extends entirely through said socket member.

At the outer end of the cylindrical portion 34 is formed an annular shoulder 35', preferably of about the same diameter as the exterior of the tube 10, and the inner side of this shoulder is preferably of conical shape, as indicated at 36, so that an annular space, V-shape in cross section, as illustrated at 37, is formed between the shoulder 35' and the adjacent end 38 of the tube 10, which space may be filled with weld metal, as indicated at 39, so as to rigidly attach the socket member to the tube.

An aperture 40 is formed through one wall of the socket member 34, at the proper location to receive the protruding, outer end of the latch bolt 27, when the shank 22 is inserted into the bore 35 of the socket, as shown in Fig. 3, and a registering aperture 41 is formed in the adjacent wall of the tube 10.

With this construction it will be obvious that when the shank 22 is inserted into the bore 35 of the socket, the bevelled end 28 of the latch bolt 27 will cause the latch bolt to be forced inwardly in the shank, compressing the spring 31, until the shank is entirely inserted into the socket, as shown in Fig. 3, when the spring will force the latch bolt outward, into the aperture 40 of the socket member, securely locking the two auger sections together.

When it is desired to separate the auger sections a suitable tool may be inserted through the apertures 40 and 41 and the latch bolt depressed so that the shank may be withdrawn from the socket.

It will be obvious that in the event of breaking or loosening of the weld, neither the shank or the socket can be forced back into the tubular shaft, as the enlarged, annular shoulders 17 and 35', on the shank member and socket member respectively, being of greater diameter than the interior of the tube, will prevent any further inward movement of either of said members.

In Figs. 4, 5 and 6 is shown a modification, in which the socket members 34, constructed as shown in Figs. 2 and 3 and as above described, are connected to both ends of each auger section in the manner above described in detail, and a detachable, double shank member is provided for insertion into the sockets at adjacent ends of two auger sections to detachably connect them together.

This double shank member comprises two oppositely disposed shank portions 22a, having a central flange or shoulder 42 formed therebetween. Each of the shank portions 22a may be identically the same as the shank 22 shown in Figs. 1 and 3 and above described, and each may have mounted therein a latching device constructed and operated in the same manner as the latching device above described. However, as shown in Figs. 4 and 6, these latches may be located at angles to each other if desired.

In attaching two auger sections together with this double shank member, one shank portion 22a is inserted into the socket 34 of one auger section and the other shank portion is inserted into the socket at the adjacent end of the other section, as shown in Fig. 6.

As the shanks are inserted into the sockets, the latch bolts 27 will be received in the apertures 40 thereof to lock the auger sections together until it is desired to detach them from each other when the latch bolts may be depressed as above described permitting the shank portions to be withdrawn from the sockets.

I claim:

1. In combination with two auger sections each having a tubular shaft portion, socket members connected to the ends of the tubular shafts, each socket member comprising a cylindrical portion inserted into one end of the tubular shaft and an enlarged, annular shoulder butted against and welded to the adjacent end of the tubular shaft, and a detachable, double shank member comprising two oppositely disposed shanks for fitting within said sockets and an integral, central, annular rib between said shanks.

2. In combination with two auger sections each having a tubular shaft portion, socket members connected to the ends of the tubular shafts, each socket member comprising a cylindrical portion inserted into one end of the tubular shaft and an enlarged, annular shoulder butted against and welded to the adjacent end of the tubular shaft, a detachable, double shank member comprising two oppositely disposed shanks for fitting within said sockets and an integral, central, annular rib between said shanks, and cooperating latching means on the shanks and sockets.

3. In combination with an auger section having a tubular shaft portion, means for connecting said auger section to a similar section, said means including a socket member having a cylindrical portion inserted into one end of the tubular shaft portion and fixedly attached thereto, there being a transverse aperture in one side of said socket member, a shank member carried by a similar section and adapted to be inserted into said socket member, there being a transverse bore located entirely through said shank member, and diametrically opposed longitudinal grooves communicating with opposite sides of said bore and terminating near one end thereof, a latch bolt slidably mounted in said bore, there being a transverse opening through said latch bolt, a pin slidably located through said transverse opening and having its ends located in said longitudinal grooves, a screw cap in the other end of the bore, and a coil spring in the bore between the screw cap and the latch bolt for projecting the latch bolt into the transverse aperture in the socket member.

4. In combination with an auger section having a tubular shaft portion, means for connecting said auger section to a similar section, said means including a socket member having a cylindrical portion inserted into one end of said tubular shaft portion and fixedly attached thereto, there being a transverse aperture in one side of said socket member, a shank member having a cylindrical portion inserted into the other end of the tubular shaft portion and fixedly attached thereto, an integral shank upon the shank member adapted to be inserted into the socket of a similar auger section, there being a transverse bore located entirely through said shank and diametrically opposed longitudinal grooves communicating with opposite sides of said bore and terminating near one end thereof, a latch bolt slidably mounted in said bore, there being a transverse opening through said latch bolt, a pin slidably located through said transverse opening and having its ends located in said longitudinal grooves, a screw cap in the other end of the bore, and a spring in the bore between the screw cap and the latch bolt for projecting the latch bolt into the transverse aperture in the socket member.

5. In combination with two auger sections each having a tubular shaft portion, means for detachably connecting said auger sections together, said means including a socket member having a cylindrical portion inserted into one end of one tubular shaft portion and fixedly attached thereto, there being a transverse aperture in one side of said socket member, a shank member having a cylindrical portion inserted into one end of the other tubular shaft portion and fixedly attached thereto, an integral shank upon the shank member adapted to be inserted into the socket member, there being a transverse bore located entirely through said shank, and diametrically opposed longitudinal grooves communicating with opposite sides of said bore and terminating near one end thereof, a latch bolt slidably located through said transverse opening and having its ends located in said longitudinal grooves, a screw cap in the other end of the bore, and a coil spring in the bore between the screw cap and the latch bolt for projecting the latch bolt into the transverse aperture in the socket member.

6. In combination with two auger sections each having a tubular shaft portion, socket members connected to the ends of the tubular shafts, each socket member comprising a cylindrical portion inserted into one end of one tubular shaft and fixedly attached thereto, there being a transverse aperture in one side of each socket member, a detachable double shank member comprising two oppositely disposed shanks for fitting within said sockets and an integral, central, annular rib between said shanks, there being a transverse bore located entirely through each shank and diametrically opposed longitudinal grooves communicating with opposite sides of said bore and terminating near one end thereof, a latch bolt slidably mounted in each of said bores, there being a transverse opening through each latch bolt, a pin slidably located through each transverse opening and having its ends located in said longitudinal grooves, a screw cap in the other end of each bore, and a coil spring in each bore between the screw cap and the latch bolt for projecting the latch bolt into the transverse aperture in the corresponding socket member.

HARRY L. WEIKART.

REFERENCES CITED

The following references are of record in the file of this patent:

UNITED STATES PATENTS

| Number | Name | Date |
| --- | --- | --- |
| 932,071 | Urbscheit | Aug. 24, 1909 |
| 932,744 | Adams | Aug. 31, 1909 |
| 1,236,145 | Burns | Aug. 7, 1917 |
| 2,206,166 | Dunn | July 2, 1940 |
| 2,221,680 | Parrish | Nov. 12, 1940 |
| 2,259,191 | Allen | Oct. 14, 1941 |
| 2,477,818 | Murdock | Aug. 2, 1949 |

FOREIGN PATENTS

| Number | Country | Date |
| --- | --- | --- |
| 591,570 | Great Britain | Aug. 21, 1947 |